June 6, 1967      W. A. JENNINGS      3,323,815
FRICTION COLLAR ASSEMBLY
Filed March 15, 1965
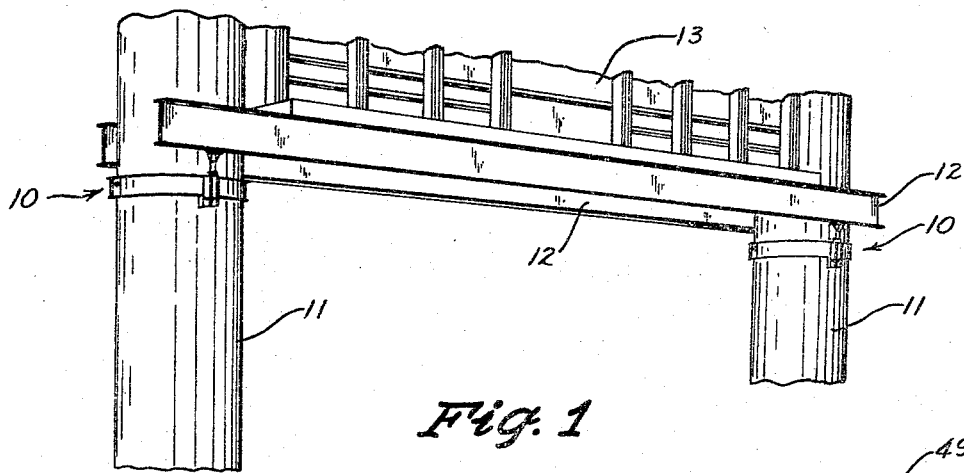
Fig. 1
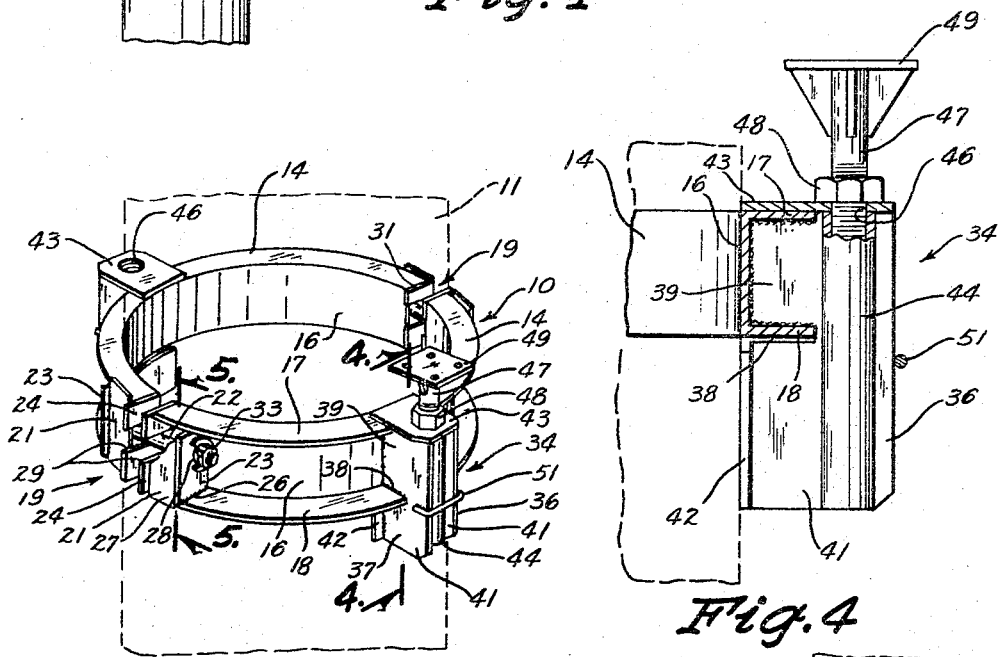
Fig. 2
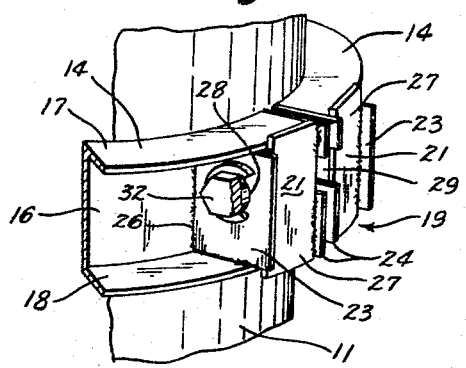
Fig. 3
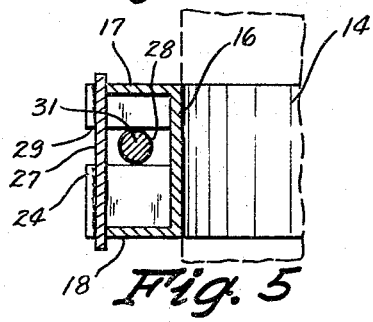
Fig. 4
Fig. 5
INVENTOR
WILLIAM A. JENNINGS
BY Rudolph L. Lowell
ATTORNEY

United States Patent Office 3,323,815
Patented June 6, 1967

3,323,815
FRICTION COLLAR ASSEMBLY
William A. Jennings, Des Moines, Iowa, assignor to Economy Forms Corporation, Des Moines, Iowa, a corporation of Iowa
Filed Mar. 15, 1965, Ser. No. 439,652
5 Claims. (Cl. 287—52.03)

ABSTRACT OF THE DISCLOSURE

A load supporting friction collar mountable about a concrete column is comprised of a pair of half ring sections each of which includes an upright curved bearing wall engageable with the column and a load supporting unit intermediate the ends of a ring section. Bolts for connecting adjacent ends of the ring sections are extended horizontally more adjacent to the top edge of the bearing wall than to its bottom edge. A bearing portion depends from the bearing wall in axial alignment with a corresponding load supporting unit. When load is applied on the supporting units, the bolts hold the top of the bearing wall on the column, and the depending bearing portions are forced against the column to effect a maximum frictional engagement of the collar with the column.

---

This invention relates generally to column mounted supports and in particular to a column mounted friction collar assembly for supporting concrete forms in the building of bridges, tunnels, building slabs, and the like.

An object of this invention is to provide an improved friction collar assembly.

A further object of this invention is to provide a friction collar assembly capable of supporting on the order of about fifty tons with a minimum of slippage relative to a concrete cylindrical column on which it is mounted.

Still another object of this invention is to provide a friction collar assembly which is economical in cost, readily and quickly mounted in positive frictional engagement about a cylindrical column, and efficient in operation to support heavy loads.

Further objects, features and advantages of this invention will become apparent from the following description when taken in connection with the accompanying drawing in which:

FIG. 1 is a fragmentary perspective view showing a concrete form structure supported from a pair of column mounted friction collar assemblies of this invention;

FIG. 2 is an enlarged perspective view of a friction collar assembly shown generally in FIG. 1;

FIG. 3 is an enlarged detail perspective view of a coupling unit forming part of a friction collar assembly; and FIGS. 4 and 5 are enlarged sectional views taken along the lines 4—4 and 5—5, respectively, in FIG. 2.

Referring to FIG. 1 of the drawing, there is shown a pair of the friction collar assemblies of this invention, designated generally as 10, in mounted positions about cylindrical concrete columns 11. Structural beams 12 extended between and supported on the friction collar assemblies 10 carry a concrete form structure 13.

As shown in FIG. 2, each friction collar assembly 10 constitutes a separable ring structure which is formed of a pair of like half sections or semicircular ring members 14. The ring structure is of a generally channel or C-shape in transverse section so that each ring section 14 has an upright inner bearing wall 16 formed with a curvature substantially equal to the curvature of the column 11 on which the collar assemblies 10 are to be mounted. Secured to and extended laterally outwardly from the upper and lower edges of the bearing wall 16 are flanges 17 and 18, respectively.

The half-ring sections 14 are connected together by a pair of like coupling units indicated generally as 19, for connecting together corresponding adjacent ends of the sections 14. Each coupling unit 19 (FIGS. 2 and 3) includes a pair of box structures 21, and an elongated connecting means 22. A box structure 21 is located at each end of a half ring section 14 and is comprised of a pair of end walls 23 and 24 consisting of metal plates arranged in a circumferentially spaced relation between the flanges 17 and 18 and secured to such flanges and to the bearing member 16 by a weld means indicated at 26. A box structure 21 is closed by an outer wall 27 arranged opposite the inner bearing wall 16 and secured, as by a weld, to the flanges 16 and 17 and to the end walls 23 and 24.

Referring to FIGS. 2 and 5, it is seen that the end walls 23 and 24 are formed with aligned openings 28 and 29, respectively, located adjacent the upper flange 17 and with the opening 29 being elongated transversely of the box structure 21.

A connecting means 22 is illustrated as being a bolt unit 31 extended through the openings 28 and 29 in adjacent structures 21, with the bolt head 32 and associated nut 33 in bearing engagement with the walls 23 about the openings 28 therein. Thus with the half-ring sections 14 positioned about a column 11 and with the bolt unit 31 connected to adjacent box structures 21, the half-ring sections 14 are coupled together in clamped frictional engagement with the peripheral surface of the column 11.

Each half-ring section 14 is provided with a load supporting unit 34 (FIGS. 2 and 4) having a pair of oppositely spaced wall members 36 and 37 of a generally rectangular shape notched at 38 so that the upper portion 39 of each side wall fits within an area defined by the flanges 17 and 18 and the bearing wall 16 and the lower portion 41 of each side wall 36 and 37 projects downwardly below the lower flange 18.

Extended across and connected by welding to the inner edges of the lower wall portions 41 of the walls 36 and 37 is a downward extension 42 of the bearing member 16 of a half-ring section 14. The supper ends of the side walls 36 and 37 are recessed to receive the upper flange 17 and a top plate 43 is secured as by welding to a top surface portion of the upper flange 17 and to the upper edges of the walls 36 and 37.

A screw receiving tube 44 (FIGS. 2 and 4) is projected through a hole 46 formed in the top plate 43 at a position between the walls 36 and 37 and outwardly of the flanges 17 and 18. An upright screw 47 receivable within the tube 44 is operatively associated with a nut 48 that is in bearing engagement with the top plate 43. The upper end of the screw 47 terminates in a horizontal platform 49 on which the load carrying beams 12 (FIG. 1) are supported. On adjustment of the nut 48, the platform 49 is lowered or raised to adjust the beams 12 to a desired position. A strap 51 connected to and extended between the walls 36 and 37 provides connection with a crane hook or the like to facilitate the handling of a half-ring section 14.

The ability of a friction collar assembly 10 to support a load against appreciable slippage relative to column 11 is dependent essentially on the function of the coupling units 19 to maintain the inner peripheral surface of the bearing wall 16 in maximum frictional engagement with the peripheral surface of a column 11. As previously mentioned, the bolt units 31 are positioned adjacent to the upper flange 17. Further, and as best appears in FIG. 4, a load supporting platform 49 is positioned outwardly from the flanges 17 and 18 so as to effect a cantilever action relative to the bearing member 16. This action is double counteracted in a friction collar assembly 10 by the location of a bolt unit 31 adjacent to the flange 17 and by the provision of a depending bearing member 42 at each load supporting unit 34.

In other words, the load acting on the platform 49 tends to move the upper peripheral portion of the bearing member 16 away from the peripheral surface of the column concurrently with forcing the lower peripheral portion of the bearing member into the column. By virtue of the location of the bolt unit 31 adjacent to the upper flange 17 the upper peripheral portion of the bearing wall 16 is maintained against the column 11 while the bearing extension 42 acts to minimize the cutting action of the lower peripheral portion of the bearing wall 16 against the column. This complemental action provides for a maximum frictional engagement between the bearing member 16 and the column 11.

In one embodiment of the invention the half-ring sections 14 are formed about a one foot radius with a bearing wall 16 being about six inches high and the flanges 17 and 18 about three inches wide. In this embodiment, the flanges 17 and 18 and bearing wall 16 are formed of a metal material about one quarter of an inch in thickness. Likewise, the box structures 21 and load support units 34 are formed of one quarter inch thick material with a bolt unit 31 being about one and one quarter inches in diameter.

The thickness of the material is dependent on its resistance to conform about a column 11 and its strength to support the required load. Thus, if the material is too thick, sufficient load strength will be obtained but the half-ring sections 14 might not conform or wrap with maximum frictional engagement about the column 11. If the material thickness is too thin, wrapping about the column 11 will be obtained but strength to support the required load will be lost. The transverse openings 29 in the outer end walls 24 of the box structures 21 accommodate the bolts 31 for variations in the diameters of the pillars or cylindrical columns 11.

Although the invention has been described with respect to a preferred embodiment thereof, it is to be understood that it is not to be so limited since changes can be made therein which are within the full intended scope of this invention as defined by the appended claims.

I claim:
1. A friction collar assembly for mounting about an upright cylindrical column comprising:
  (a) a ring member of a substantially channel shape in transverse section having a base portion forming an inner upright peripheral bearing surface and upper and lower leg portions extended laterally outwardly from said base portion, said ring member including a pair of half-sections,
  (b) a pair of coupling units corresponding to adjacent ends of said half-sections and having portions secured to opposite ends of a half-section between said leg portions,
  (c) a connecting member corresponding to each coupling unit and connectable with associated ones of said portions to connect the adjacent ends of said half-sections, each connecting member extended horizontally between said leg portions at a position more adjacent to the upper leg portion than to the lower leg portion, and
  (d) a load supporting unit secured to each of said half-sections between the ends thereof, with said base portion having a downwardly extended arcuate bearing portion corresponding to and in axial alignment with each supporting unit.
2. A collar assembly for frictionally mounting about an upright cylindrical column comprising:
  (a) a pair of semicircular ring sections oppositely arranged to form a separable ring member, each ring section being of a channel shape in transverse cross section having a base portion and upper and lower leg portions extended horizontally outwardly from said base portion,
  (b) a pair of coupling units corresponding to and secured to adjacent ends of said ring sections, each coupling unit including a single horizontally extended elongated connecting member positioned more adjacent to the upper leg portion than to the lower leg portion,
  (c) a load supporting member secured to each ring section intermediate the ends thereof and outwardly of said base portion, and
  (d) a curved depending bearing member for each load supporting member secured to said base portion intermediate the ends of a ring section in axial alignment with a corresponding load supporting member with the curvature of a depending member being the same as the curvature of the base portion.
3. A friction collar assembly for mounting about an upright cylindrical column comprising:
  (a) a pair of separable ring sections each of which includes an upright arcuate bearing wall member and a pair of upper and lower horizontal flanges secured to and extended laterally outwardly from the upper and lower edges, respectively, of each said bearing wall member, and
  (b) coupling units secured to the ends of said ring sections for connecting together adjacent ends of said ring sections, said coupling units located between and within the confines of said horizontal flanges and each coupling unit including a single connecting member extended between adjacent ends of said ring sections at a position more adjacent to said upper flange than to said lower flange and an adjustable load supporting unit secured to each ring section.
4. The invention according to claim 3 including:
  (a) said load supporting unit secured to each ring section intermediate the ends thereof, and
  (b) an arcuate bearing extension projected downwardly from each bearing member in axial alignment with a load supporting unit.
5. A friction collar assembly for mounting about an upright cylindrical column comprising:
  (a) a separable ring member formed of a pair of substantially arcuate half-sections each of which has an upright curved bearing portion,
  (b) a coupling unit corresponding to each pair of adjacent ends of said half-sections,
  (c) each coupling unit including only a single adjustable connecting member horizontally extended between said corresponding adjacent ends at a position more adjacent to the upper edges than to the lower edges of said bearing portions, and
  (d) a load supporting unit secured to each half-section intermediate the ends thereof and projected laterally outwardly therefrom,
  (e) each bearing portion having a downwardly extended projection in axial alignment with a load supporting unit.

References Cited

UNITED STATES PATENTS

| | | | |
|---|---|---|---|
| 272,974 | 2/1883 | Pearce | 287—52.03 |
| 1,710,693 | 4/1929 | Davidson | 287—54 |
| 1,863,970 | 6/1932 | Donald | 287—49 X |
| 2,007,497 | 7/1935 | Kaplan | 287—54 |
| 2,037,980 | 4/1936 | Heartz | 287—54 |
| 3,006,669 | 10/1961 | Novales | 287—54 |

FOREIGN PATENTS 516,914  1/1953  Belgium.

CARL W. TOMLIN, Primary Examiner.

A. V. KUNDRAT, Assistant Examiner.